C. F. STRAWN.
STEERING GEAR.
APPLICATION FILED DEC. 26, 1908.
923,210.
Patented June 1, 1909.
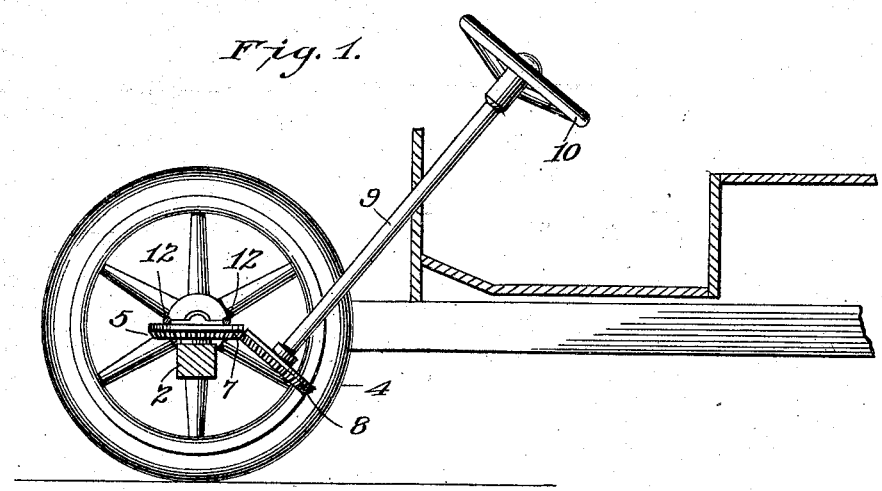
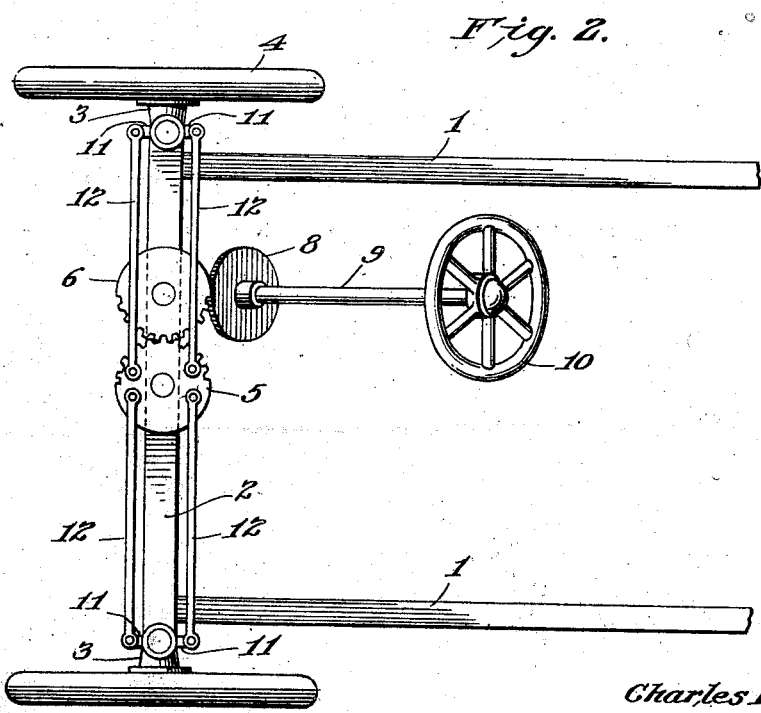
Witnesses
M. C. Lyddane
J. O. L. Mulhall
Inventor
Charles F. Strawn
By Joshua R. H. Potts
Attorney

UNITED STATES PATENT OFFICE.

CHARLES F. STRAWN, OF PHILADELPHIA, PENNSYLVANIA.

STEERING-GEAR.

No. 923,210.    Specification of Letters Patent.    Patented June 1, 1909.

Application filed December 26, 1908. Serial No. 469,287.

*To all whom it may concern:*

Be it known that I, CHARLES F. STRAWN, a citizen of the United States, residing at Philadelphia, in the county of Philadelphia and State of Pennsylvania, have invented certain new and useful Improvements in Steering-Gears, of which the following is a specification.

My invention relates to an improved steering gear, more particularly designed for use on motor vehicles, the object of the invention being to provide improved means for turning a segmental gear, and connect said gear by means of four rods, with the axle stub crank-arms, so as to provide an extremely strong and durable steering gear, and one which will operate effectually in the event of any of the rods becoming broken or disconnected.

A further object is to provide improvements of this character, of extremely simple and inexpensive construction, and which will be extremely sensitive to the manipulation of the steering wheel.

With these and other objects in view, the invention consists in certain novel features of construction, and combinations, and arrangement of parts as will be more fully hereinafter described and pointed out in the claim.

In the accompanying drawings Figure 1, is a view in longitudinal section illustrating the application of my improvements to a motor vehicle, and Fig. 2, is a plan view.

1 represents side bars of a motor vehicle frame, connected at their forward ends to the fixed axle 2, and 3 represents axle stubs having pivotal connection with the ends of the fixed axle 2, and mounted in the ordinary wheels 4.

At the center of the fixed axle 2, a segmental gear 5 is mounted, and is in mesh with a segmental gear 6, also mounted on the axle 2. This segmental gear 6 is provided on its under face with a series of beveled gear teeth 7, in mesh with a beveled gear 8, the latter secured upon the lower end of the steering shaft 9, and a hand wheel 10 is secured upon the upper end of said steering shaft. Thus when the steering wheel 10 is turned, the gear 8 will transmit motion to the gear 6, and the latter to the gear 5, for a purpose which will now be explained.

The axle stubs 3 are both provided with forwardly and rearwardly projecting crank arms 11, and these arms are connected by rods 12 with the gear 5. The connection between said rods and the gear and crank-arms, is a pivotal one, a simple pin connection being shown, but other forms of connection may be provided. It will thus be observed that four rods 12 are employed, two of them connecting the gear 5 with the crank-arms 11 of the axle stub 3 at one side of the vehicle, while the other rods 12 connect the crank-arms 11 of the other axle stub 3.

In the event of injury to any of the arms, the steering gear will operate with equal effectiveness, as the movement of one crank-arm 11 is all that is necessary to pivot the axle stub, but with two arms in use a much stronger construction is provided, as there is a push on one rod and a pull on the other whenever the axle stubs are swung.

By providing a construction of the three gears as above explained, a direct transmitting means is provided between the steering shaft 9 and the pinion 5, which is extremely sensitive to the movement of hand wheel 10, and hence the vehicle can be quickly manipulated, which is an extremely desirable feature of my improvements.

In the first place, it must be understood that the rods 12 are thin steel rods, which though of great strength to withstand longitudinal strains and stresses, are also flexible and capable of great lateral bending. This lateral bending of the rods will compensate for any difference in movement of the pivotal points. For instance, with the parts as shown in Fig. 2, and referring to the upper wheel on the sheet, if the gear 5 is turned from left to right, the right hand rod will be drawn downward as the left hand rod is moved upwardly, and while there will be a slight difference of vertical movement (keeping in mind the position of the drawing on the sheet and not the actual position of the parts on the machine) of the rods and pivotal points, but this will be compensated for by the bowing of the rods. It might be true that this structure would work easier if the pivotal points at the inner ends of the rods 12 were in line with the center of gear 5, but in order to do this, it would be necessary to have only two pivot pins, which would in the event of a pin becoming broken disable both rods connected to the same. The broad purpose of applicant's invention is to provide four separately connected rods, which would in the event of the disabling of one, not interfere with the perfect operation of the machine, and with this end in view, the fact that the steering may be a trifle harder than it might otherwise be, is compensated for by the minimizing of the danger of disabling the steering gear. The rods 12 on a full size machine would measure probably two and one half feet in length, and one half inch or less in diameter, and hence there would be a great amount of flexibility for lateral bending between the ends of the rods, and while but very slight lateral bending would be necessary to compensate for the difference in movement of the pivotal points, sufficient flexibility is inherent in the rods to compensate for a great deal of difference in movement.

Various slight changes might be made in the general form and arrangement of parts described without departing from my invention, and hence I do not restrict myself to the precise detail set forth, but consider myself at liberty to make such changes and alterations as fairly fall within the spirit and scope of my invention.

Having thus described my invention what I claim as new and desire to secure by Letters Patent is:

In a steering gear, the combination with a fixed support, axle stubs pivotally connected to the ends of said support, and crank arms projecting from opposite sides of said axle stubs, of a segmental gear mounted on said support at its center, rods connecting all of said crank arms with said gear, a segmental gear secured on the support at one side of the center and in mesh with said first mentioned gear, a series of beveled gear teeth on said last mentioned gear, a steering shaft located at one side of the center of the support, a beveled gear on said steering shaft meshing with said series of gear teeth, and a steering wheel on said steering shaft.

In testimony whereof I have signed my name to this specification in the presence of two subscribing witnesses.

CHARLES F. STRAWN.

Witnesses:
R. H. KREUKEL,
J. A. L. MULHALL.